United States Patent
Feldman et al.

(10) Patent No.: US 11,935,284 B2
(45) Date of Patent: Mar. 19, 2024

(54) CLASSIFICATION WITH MODEL AND LOCALIZATION UNCERTAINTY

(71) Applicant: TECHNION RESEARCH & DEVELOPMENT FOUNDATION LIMITED, Haifa (IL)

(72) Inventors: Yuri Feldman, Netanya (IL); Vadim Indelman, Haifa (IL)

(*) Notice: Subject to any disclaimer, the term of this patent is extended or adjusted under 35 U.S.C. 154(b) by 522 days.

(21) Appl. No.: 17/266,598

(22) PCT Filed: Aug. 8, 2019

(86) PCT No.: PCT/IL2019/050899
§ 371 (c)(1),
(2) Date: Feb. 7, 2021

(87) PCT Pub. No.: WO2020/031188
PCT Pub. Date: Feb. 13, 2020

(65) Prior Publication Data
US 2021/0312246 A1    Oct. 7, 2021

Related U.S. Application Data

(60) Provisional application No. 62/715,871, filed on Aug. 8, 2018.

(51) Int. Cl.
| | |
|---|---|
| *G06V 20/58* | (2022.01) |
| *G06F 18/241* | (2023.01) |
| *G06F 18/2431* | (2023.01) |
| *G06F 18/25* | (2023.01) |
| *G06N 7/01* | (2023.01) |
| *G06V 10/84* | (2022.01) |
| *G06V 20/10* | (2022.01) |
| *G06V 10/62* | (2022.01) |

(52) U.S. Cl.
CPC ............ *G06V 10/84* (2022.01); *G06F 18/241* (2023.01); *G06F 18/2431* (2023.01); *G06F 18/254* (2023.01); *G06N 7/01* (2023.01); *G06V 20/10* (2022.01); *G06V 20/58* (2022.01); *G06V 10/62* (2022.01)

(58) Field of Classification Search
CPC ...................................................... G06V 10/84
See application file for complete search history.

(56) References Cited

U.S. PATENT DOCUMENTS

| | | | |
|---|---|---|---|
| 11,069,082 B1* | 7/2021 | Ebrahimi Afrouzi .. | H04N 23/56 |
| 11,348,269 B1* | 5/2022 | Ebrahimi Afrouzi ..... | G06T 7/33 |
| 2020/0201350 A1* | 6/2020 | Newman .............. | G05D 1/0246 |

(Continued)

OTHER PUBLICATIONS

Yarin Gal et al.; "Dropout as a Bayesian Approximation: Representing Model Uncertainty in Deep Learning";University of Cambridge; arXiv:1506.02142v6 [stat. ML] Oct. 4, 2016; 12 pages.

(Continued)

*Primary Examiner* — Oneal R Mistry
(74) *Attorney, Agent, or Firm* — The Roy Gross Law Firm, LLC; Roy Gross

(57) ABSTRACT

Methods and systems are provided for fusing responses of a classifier that provides a model uncertainty measure, while accounting for viewpoint-dependent variations in object appearance and correlations in classifier responses, and accounting for localization uncertainty.

9 Claims, 12 Drawing Sheets

(56) References Cited

U.S. PATENT DOCUMENTS

2020/0348111 A1* 11/2020 Howe .................. G01S 13/66
2021/0312246 A1* 10/2021 Feldman ............... G06V 10/84

OTHER PUBLICATIONS

Yarin Gal et al.; "Bayesian Convolutional Neural Networks With Bernoulli Approximate Variational Inference"; University of Cambridge; arXiv:1506.02158v6 [stat. ML] Jan. 18, 2016; 12 pages.
Michael Kaess et al.; "iSAM2: Incremental Smoothing and Mapping Using the Bayes Tree"; vol. 31 Issue 2: Special Issue on the Ninth International Workshop on Algorithmic Foundations of Robotics (WAFR); Dec. 20, 2011; 19 pages.
Pavel Myshkov et al.; "Posterior distribution analysis for Bayesian inference in neural networks"; https://wwwsemanticscholar.org/paper/Posterior-distribution-analysis-for-Bayesian-in-Myshkov-Julier/6197dbd691037a412b67df688541df7c9ae87c0d; 2016; 8 pages.
Shayegan Omidshafiei et al.; "Hierarchical Bayesian Noise Inference for Robust Real-time Probabilistic Object Classification"; arXiv: 1605.01042v1 [cs.CV] May 3, 2016; 10 pages.
Timothy Patten et al.; "Viewpoint Evaluation for Online 3D Active Object Classification"; IEEE Robotics and Automation Letters. Preprint Version; Nov. 2015; 9 pages.
C. E. Rasmussen & C. K. I. Williams; "Gaussian Processes for Machine Learning"; the MIT Press,; www.GaussianProcess.org/gpml; 2006; 266 pages.
W. T. Luke Teacy et al.; "Observation Modelling for Vision-Based Target Search by Unmanned Aerial Vehicles"; International Foundation for Autonomous Agents and Multiagent Systems (www.ifaamas.org); Jan. 2015; 8 pages.
Javier Velez et al.; "Modelling Observation Correlations for Active Exploration and Robust Object Detection"; Journal of Artificial Intelligence Research 44 (2012) 423-453; Jul. 2012; 31 pages.
Markus Hoferlin et al.; "Uncertainty-aware video visual analytics of tracked moving objects"; Journal of Spatial Information Science No. 2; Nov. 2, 2011; pp. 87-117; 32 pages.
International Search Report of PCT/IL2019/050899 Completed Nov. 28, 2019; dated Jan. 28, 2020 5 pages.
Written Opinion of PCT/IL2019/050899 Completed Nov. 28, 2019; dated Jan. 28, 2020 10 pages.

* cited by examiner

CLASSIFICATION WITH MODEL AND LOCALIZATION UNCERTAINTY

CROSS REFERENCES TO RELATED APPLICATIONS

This application is a national phase entry of International Patent Application No. PCT/IL/2019/050899, filed Aug. 8, 2019, which claims the benefit under 35 U.S.C. § 119(b) to U.S. Provisional Patent Application No. 62/715,871, filed Aug. 8, 2018, both of which are hereby incorporated by reference.

FIELD OF THE INVENTION

The present invention relates to robotic perception and object classification.

BACKGROUND

Object detection and classification is a component of situational awareness important to many autonomous systems and robotic tasks. The mobility of robotic systems is widely exploited to overcome limitations of static, one-point-of-view approaches to measurement classification. Limitations may include problems such as occlusions, class aliasing (due to classifier imperfections or objects that appear similar from certain viewpoints), imaging problems, and false detections. By accumulating classification evidence across multiple observations and viewpoints, uncertainty can be reduced.

Variations in object appearance are often directly addressed using offline-built class models for inference rather than raw classifier measurements. Especially in active methods, such models are often themselves spatial and view-dependent. View-dependent models can allow for better fusion of classifier measurements by modelling correlations among similar viewpoints instead of requiring the common but usually false assumption of independence of measurements. See, for example: W T Teacy, et al., "Observation modelling for vision-based target search by unmanned aerial vehicles," Intl. Conf. on Autonomous Agents and Multiagent Systems," AAMAS, pp. 1607-1614, 2015, hereinbelow, "Teacy"; Javier Velez, et al., "Modelling observation correlations for active exploration and robust object detection," J. of Artificial Intelligence Research, 2012, hereinbelow, "Velez".

Reliance on spatial models, however, introduces new problems, as robot localization is usually not precisely resolved, leading to errors when matching measurements against the model. This is aggravated in the presence of classifier measurements that do not comply with the model, as may happen when a classifier is deployed in an environment different in appearance from the one on which it was trained on; for example, in a different country where objects semantically identical to the ones in the training set look different. In the latter case, classifier output would often be arbitrary, rather than reflecting actual uncertainty, known as model uncertainty, as described by Yarin Gal and Zoubin Ghahramani, "Dropout as a Bayesian approximation: Representing model uncertainty in deep learning," Intl. Conf. on Machine Learning (ICML), 2016 (hereinbelow, "Gal-ICML"). In the domain of Bayesian deep learning, methods exist to approximate the above uncertainty as a network posterior, as described by and Pavel Myshkov and Simon Julier, "Posterior distribution analysis for Bayesian inference in neural networks," Advances in Neural Information Processing Systems (NIPS), 2016. One method is based on test-time dropout, as described by Yarin Gal and Zoubin Ghahramani, "Bayesian convolutional neural networks with Bernoulli approximate variational inference," arXiv preprint arXiv:1506.02158, 2016 (hereinbelow, "Gal-ArXiv"). Dropout permits the calculation of network posteriors for virtually any deep learning-based classifier, without requiring a change in the model.

Visual classification fusion methods can be split into methods directly using classifier scores, and methods matching classifier measurements to a statistical model, or fusing them using a specially trained classifier. The rationale for using a class model rather than individual classifier measurements lies in the variation in object appearance and background with viewpoint, which cannot always be correctly captured by the classifier, as well as situations where training data is not representative of the test data, e.g. where a classifier was not or cannot be retrained specifically for the domain where it is deployed and therefore its responses cannot be directly relied upon. Viewpoint-dependent object appearance (and hence, classifier response) may be analyzed as classifier noise (e.g. Omidshafiei, et al., "Hierarchical Bayesian noise inference for robust real-time probabilistic object classification," preprint arXiv:1605.01042, 2016, hereinbelow "Omidshafiei"). Alternatively, the viewpoint-dependent object appearance may be modeled as spatial variation directly.

A common assumption in many classification methods is that of statistical independence of individual class measurements. This assumption is generally false, e.g. observations from the same or similar poses are likely to be extremely similar, resulting in similar classifier responses. Considering these observations as independent leads to an overly-confident posterior. Velez and Teacy deal with this by learning Gaussian Process (GP) regressors to describe both per-class spatial variation in classifier responses and spatial statistical dependence.

Another often-violated common assumption is that of known robot localization. This is specifically the weakness of methods modelling spatial variation of classifier responses, as localization error may introduce class aliasing when matching classifier responses against a spatial model.

Monte-Carlo dropout can be interpreted as an approximation to model uncertainty of a Bayesian neural network classifier, expressed as posterior distribution of the output for Gaussian priors on weights (Gal-Arxiv). Model uncertainty quantifies the reliability of classifier responses for given input data, complementing the classifier response vector (softmax output). While there are other ways of approximating network posterior and other reliability measures, MC dropout is practical because it requires no change in architecture or computations that are not otherwise part of the model.

Existing classification fusion methods do not address model uncertainty. Indeed, with few exceptions most current methods discard the classification vector commonly output by the classifier, only using the most likely class (i.e., the component with the highest response) for belief updates. Likewise, most methods ignore uncertainty in localization, assuming it perfectly known.

SUMMARY OF THE INVENTION

Embodiments of the present invention provide methods and systems for (a) fusing responses of a classifier that provides a model uncertainty measure, while (b) accounting for viewpoint-dependent variations in object appearance and correlations in classifier responses, and (c) accounting for localization uncertainty. Simulation confirms that the process is robust with respect to the sources of uncertainty compared with other methods. By fusing responses of a classifier that provides a model uncertainty measure, while accounting for viewpoint-dependent variations in object appearance and correlations in classifier responses, and accounting for localization uncertainty, the methods and system provided by the present invention identify which of multiple known Gaussian processes (GPs) is the most likely origin of measurements of an object viewed from different viewpoints.

There is therefore provided by embodiments of the present invention, a method of classifying an object and determining an uncertainty of the object classification, wherein the object appears in multiple sequential measurements of a scene, the method including: fusing responses of a classifier that provides a model uncertainty measure, while accounting for viewpoint-dependent variations in object appearance and correlations in classifier responses, and accounting for localization uncertainty, to provide comparative object classification distributions. The multiple sequential measurements may be measurements such as images, laser scans, or other measurements known in the field of robotic perception. The measurements of the scene are typically acquired by a robot moving along a given trajectory, and no initial localization information is provided to the classifier regarding the robot's coordinates or orientation, or regarding the object's coordinates or orientation.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Embodiments of the present invention provide methods for object classification of objects viewed from multiple poses, where the classification includes measures of classifier model uncertainty, robot localization uncertainty, and spatial correlation.

Problem Formulation

Consider a robot traversing an unknown environment, taking observations of different scenes. Robot motion between times $t_k$ and $t_{k+1}$ is initiated by a control input $u_k$, that may originate from a human user, or be determined by a motion planning algorithm. Let the robot pose at time instant k be denoted as $x_k$, and define $X_{0:k}=\{x_0, \ldots, x_k\}$ as the sequence of poses up to that time.

Let $\mathbb{H}_k=\{\mathcal{U}_{0:k-1}, \mathcal{Z}_{0:k}\}$ represent the history, comprising observations $\mathcal{Z}_{0:k}=\{z_0, \ldots, z_k\}$ and controls $\mathcal{U}_{0:k-1}=\{u_0, \ldots, u_{k-1}\}$ up until time k. The goal is to classify a single object belonging to one of $N_c$ known classes, denoted by indexes $\mathcal{C}=\{1, \ldots, N_c\}$.

The classification posterior, or belief, at time instant k is:

$$b[c_k] \triangleq \mathbb{P}(c|\mathcal{H}_k). \quad (1)$$

The classification posterior is the probability that the object in question belongs to a class $c \in \mathcal{C}$, given all measurements and user controls up to time k. In calculating this posterior we want to take into account spatial correlation among measurements, model uncertainty, as well as uncertainty in the positions from which these measurements are taken (i.e., localization uncertainty).

Classifier Model

Figure 2:
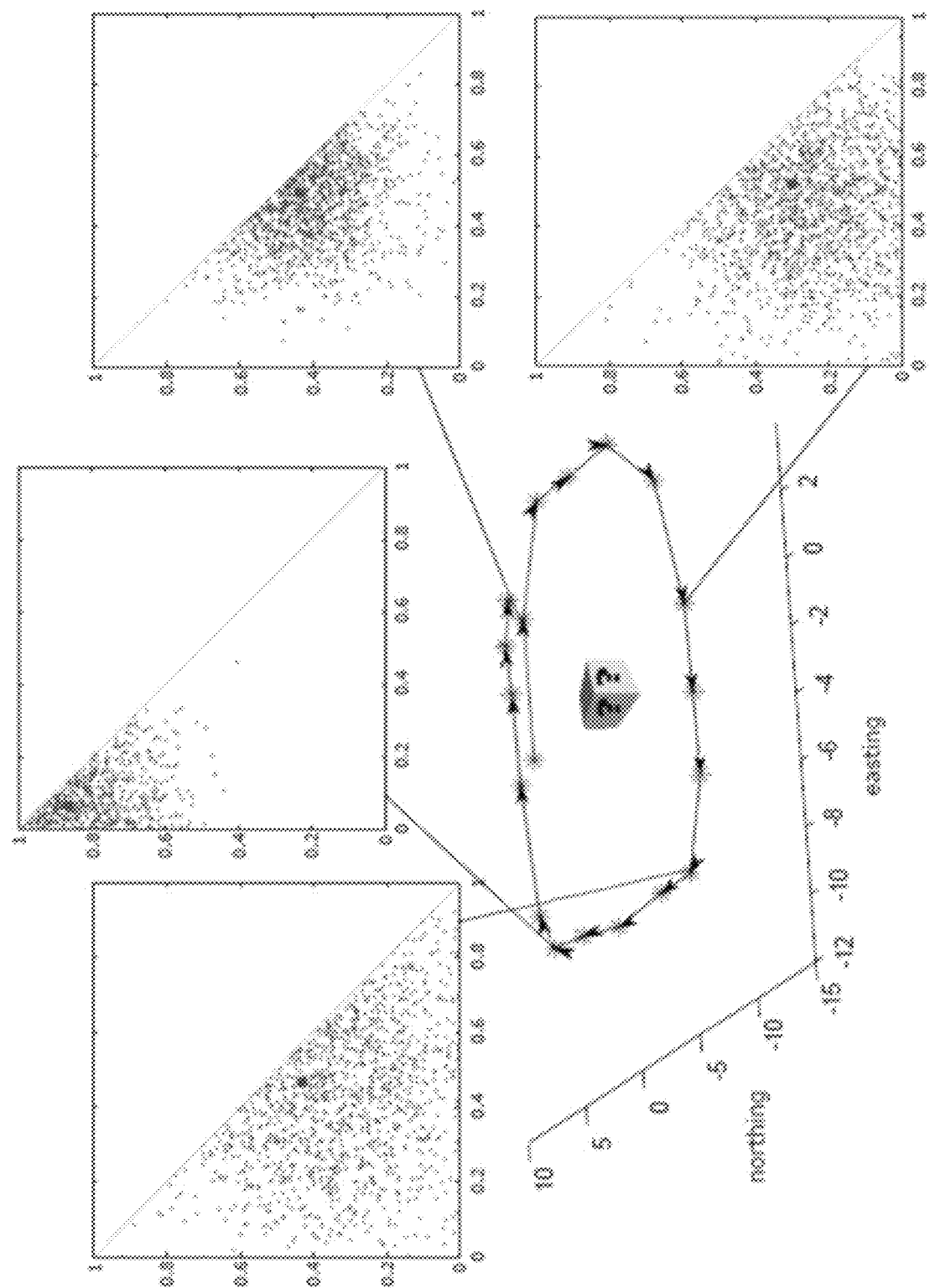
FIG. 2 is a schematic diagram of a scenario indicating a robot acquiring observations while moving along a path in the vicinity of an object of interest, according to an embodiment of the present invention.

Commonly, output of a classifier can be interpreted as a categorical distribution over classes (e.g. by applying softmax to its outputs). However, high responses may be unstable, specifically, when inputs are far from training data. The technique proposed by Gal (ICML) may be used to obtain an approximation for the model uncertainty of the neural network classifier. By this technique, for every classifier input, several forward passes are performed, applying random dropouts at each pass, to obtain a set of classification vectors. Subsequently, the uncertainty is characterized, yielding classifier output as shown in FIG. 2. Typically, the robot has at its disposal an object classifier unit, which, given observation $z_k$ (e.g., an image or measurement, such as a laser scan), calculates a set of outputs $S_k \triangleq \{s_k\}$, where each output $s_k \in \mathbb{R}^{N_c \times 1}$ represents a categorical belief over the class of the observed object, i.e.

$$\sum_{i=1}^{N_c} s_k^{(i)} = 1.$$

The set $S_k$ can be interpreted as an approximation to the distribution:

$$\mathbb{P}(s|z_k), \quad (2)$$

carrying information of the classifier's model uncertainty for the given input $z_k$.

Viewpoint-Dependent Class Model

For the class likelihood we use a model similar to the one proposed by Teacy. For a single classifier measurement s (categorical vector) made from relative pose $x^{(rel)}$, the class likelihood is a probabilistic model:

$$\mathbb{P}(s|c, x_k^{(rel)}), \quad (3)$$

where $c \in \mathcal{C}$ is the object class, and the k subscript denotes a time index. Denoting object pose in global frame as o we can explicitly write:

$$x_k^{(rel)} = x_k \ominus o. \quad (4)$$

The dependence of the model in Eq. (3) on viewpoint naturally captures view-dependent variations in object appearance. Furthermore, to incorporate the notion that similar views tend to yield similar classifier responses and in particular, are not independent, the joint distribution:

$$\mathbb{P}(S_{0:k} | c, \mathcal{X}_{0:k}^{(rel)}), \quad (5)$$

is assumed to characterize the classification unit's outputs $S_{0:k} \doteq \{S_0, \ldots, S_k\}$ when an object of class c is viewed from a sequence of relative poses $X_{0:k}^{(rel)} \doteq \{x_0^{(rel)}, \ldots, x_k^{(rel)}\}$. As described by both Teacy and of Velez, this joint distribution can be represented as a Gaussian Process, learned using a classifier unit. Explicitly, we model a training set classifier response when viewing an object of class c from a relative pose $x^{(rel)}$ as:

$$s^{(i)} = f_{i|c}(x^{(rel)}) + \varepsilon, \quad (6)$$

where the i index denotes component i of classification vector s, $\varepsilon \sim N(0, \sigma_n^2)$ i.i.d. noise, and (dropping the (rel) superscript for clarity):

$$f_{i|c}(x) \sim \mathcal{GP}(\mu_{i|c}(x), k_{i|c}(x,x)), \quad (7)$$

where $\mu_{i|c}$ and $k_{i|c}$ are the mean and covariance functions defining the GP:

$$\mu_{i|c}(x) = \mathbb{E}\{s^{(i)} | c, x\} \quad (8)$$

$$k_{i|c}(x,x') = \mathbb{E}\{(f_{i|c}(x) - \mu_{i|c}(x))(f_{i|c}(x') - \mu_{i|c}(x'))\} \quad (9)$$

The classification vector for each class c is modeled with independent, per-component GP's. Note also the Gaussian approximation of the distribution of the classification vector, which resides in the simplex (other representations exist, which however are not readily interpreted as a spatial model). For the covariance, the squared exponential function is applied:

$$k_{i|c}(x, x') = \sigma_{i|c}^2 \exp\left(-\frac{1}{2}(x - x')^T L_{i|c}^{-1}(x - x')\right), \quad (10)$$

where $\sigma_{i|c}^2$ e is the variance, and $L_{i|c}$ is the length scale matrix, determining the rate of the covariance decay with distance. These parameters can be learned from training data, however in our simulations they were set by hand.

Denote the training set for class c as $\{S_T^c, X_T^c +\}$, with $S_T^c$ being classifier measurements, and $X_T^c$ the corresponding poses, and denote (test-time) measurements as $S = S_{0:k}$ and $X = X_{0:k}^{(rel)}$. Furthermore, the equations Eqs. (11-14) all hold per vector-component, joined in Eq. (15). To simplify notation we drop the i index in $S^{(i)}$, $S_T^{(i)}$ and $k_{i|c}$.

As described in C. E. Rasmussen and C. K. I. Williams, "Gaussian Processes for Machine Learning," MIT press, Cambridge, Mass., 2006 (hereinbelow, "Rasmussen"), we model the joint distribution of classifier measurements (per-component) for object of class c as:

$$\mathbb{P}(S_T^c, S | c, X_T^c, X) = N\left(0, \begin{bmatrix} K_C(X_T^c, X_T^c) + \sigma_n^2 I & K_c(X_T^c, X) \\ K_c(X, X_T^c) & K_c(X, X) \end{bmatrix}\right), \quad (11)$$

where $K_c$ is the matrix produced by application of kernel $k_c$ on all pairs of input vectors.

We thus obtain the conditional distribution for classifier measurements of object of class c:

$$\mathbb{P}(S_{0:k} | c, X_T^c, S_T^c, X_{0:k}^{(rel)}) = N(\mu, \Sigma), \quad (12)$$

with:

$$\mu = K_c(X, X_T^c) \cdot H \cdot S \quad (13)$$

$$\Sigma = K_c(X,X) - K_c(X, X_T^c) \cdot H \cdot K_c(X_T^c, X), \quad (14)$$

and where $H \doteq (K_c(X_T^c, X_T^c) + \sigma_n^2 I)^{-1}$.

We finalize the equation by combining the per-component models into a joint class likelihood as:

$$\mathbb{P}(S | c, X_T^c, S_T^c, X) = \prod_i \mathbb{P}(S^{(i)} | c, X_T^c, S_T^{c,(i)}, X) \quad (15)$$

This approach differs from the approach described by Teacy, where inference from training data is being performed by offline learning of GP mean and covariance functions rather than by using a joint distribution as in Eq. (11).

To account for both localization and model uncertainty we rewrite Eq. (1) as marginalization over latent robot and object poses, and over classifier outputs. Marginalizing over robot pose history and object pose gives the following equations:

$$b[c_k] = \mathbb{P}(c | \mathcal{H}_k) = \int_{X_{0:k}, o} \mathbb{P}(c, X_{0:k}, o | \mathcal{H}_k) d \mathcal{X}_{0:k} do, \quad (16)$$

which, using a chain rule, can be written as $$b[c_k] = \int_{X_{0:k}, o} \underbrace{\mathbb{P}(c | \mathcal{X}_{0:k}, o, \mathcal{H}_k)}_{(a)} \underbrace{\mathbb{P}(\mathcal{X}_{0:k}, o | \mathcal{H}_k)}_{(b)} d\mathcal{X}_{0:k} do. \quad (17)$$

Term (a) above is the classification belief given relative poses $X_{0:k}^{(rel)}$ which are calculated from $X_{0:k}$ and o via Eq. (4). Term (b) represents the posterior over $X_{0:k}$ and o given observations and controls thus far. As such, this term can be obtained from existing SLAM approaches. One can further rewrite the above equation as $$b[c_k] = \mathbb{E}_{\mathcal{X}_{0:k}, o} \{\mathbb{P}(c | \mathcal{X}_{0:k}^{(rel)}, \mathcal{H}_k)\}, \quad (18)$$

where the expectation is taken with respect to the posterior $p(X_{0:k}, o | \mathcal{H}_k)$ from term (b).

Hereinbelow, we assume that object orientation relative to the robot is known (leaving o with 3 degrees of freedom), and so this posterior can be computed using SLAM methods (described below with respect to localization-inference), which commonly model this posterior with a Gaussian distribution. We then use the obtained distribution to approximate the expectation in Eq. (18) using sampling), In the following we detail the computation of the terms (a) and (b) of Eq. (17).

Classification Under Known Localization

Here we describe a method of updating the classification belief given a known pose history, which is term (a) in Eq. (17), when receiving new measurements at time step k, while accounting for correlations with previous measurements and model uncertainty.

To simplify notation, we shall denote the history of observations, controls and (known) relative poses as $$H_k \doteq \mathcal{H}_k \cup X_{0:k}^{(rel)} = \{\mathcal{U}_{0:k-1}, \mathcal{Z}_{0:k}, X_{0:k}^{(rel)}\}. \quad (19)$$

We start by marginalizing term (a) over model uncertainty in the classifier output at time k $$\mathbb{P}(c|H_k) = \int_{s_k} \mathbb{P}(c|s_k, H_k) \cdot \mathbb{P}(s_k|H_k) ds_k. \tag{20}$$

Assuming $s_k$ carries the class information from measurement $z_k$, and that $s_k \sim p(s_k|z_k)$ we can rewrite this as $$\mathbb{P}(c|H_k) = \int_{s_k} \mathbb{P}(c|s_k, H_k \setminus \{z_k\}) \cdot \mathbb{P}(s_k|z_k) ds_k. \tag{21}$$

In our case, $\{s_k\}$ are samples from $p(s_k|z_k)$, so we can approximate the integral as $$\mathbb{P}(c|H_k) \approx \frac{1}{n_k} \sum_{s_k \in S_k} \mathbb{P}(c|s_k, H_k \setminus \{z_k\}). \tag{22}$$

To calculate the summand, we apply Bayes' law and then smooth over class in the denominator $$\mathbb{P}(c|H_k) = \sum_{s_k} \frac{\eta(s_k)}{n_k} \cdot \mathbb{P}(s_k|c, H_k \setminus \{z_k\}) \cdot \mathbb{P}(c|H_k \setminus \{z_k\}) \tag{23}$$

with $$\eta(s_k) \doteq 1 \Big/ \sum_{c \in C} \mathbb{P}(s_k|c, H_k \setminus \{z_k\}) \mathbb{P}(c|H_k \setminus \{z_k\}). \tag{24}$$

Note that the denominator in $\eta(s_k)$ is a sum of numerator (summand) terms in Eq. (23) for the different classes and can be computed efficiently (but cannot be discarded altogether due to the dependence on $s_k$). Further, note that $$\mathbb{P}(c|H_k \setminus \{z_k\}) = \mathbb{P}(c|X_{0:k}^{(rel)}, \mathcal{Z}_{0:k-1}) \tag{25}$$

$$= \mathbb{P}(c|X_{0:k}^{(rel)}, \mathcal{Z}_{0:k-1}) = \mathbb{P}(c|H_{k-1}), \tag{26}$$

As $\mathbb{P}(c|H_{k-1})$ has been computed in the previous step, we are left to compute the class likelihood term $\mathbb{P}(s_k|c, H_k \setminus \{z_k\})$. This term involves past observations $\mathcal{Z}_{0:k-1}$ but not classifier outputs $S_{0:k-1}$, which need to be introduced to account for spatial correlation with $s_k$ using Eq. (5). Marginalizing over $S_{0:k-1}$ (recall that in our notation $S_{0:k-1} \cup \{s_k\} = S_{0:k}$) yields $$\mathbb{P}(s_k|c, H_k \setminus \{z_k\}) = \int_{S_{0:k-1}} \mathbb{P}(S_{0:k}|c, H_k \setminus \{z_k\}) dS_{0:k-1} = \tag{27}$$

$$\int_{S_{0:k-1}} \mathbb{P}(s_k|c, S_{0:k-1}, H_k \setminus \{z_k\}) \cdot \mathbb{P}(S_{0:k-1}|c, H_k \setminus \{z_k\}) dS_{0:k-1},$$

where we applied smoothing to separate between past classifier outputs $S_{0:k-1}$ for which observations $\mathcal{Z}_{0:k-1}$ are given and the current output $s_k$. The first term in the product reduces to $\mathbb{P}(s_k|c, S_{0:k-1}, X_{0:k}^{(rel)})$, a conditioned form of the class model Eq. (12) (and thus Gaussian, which we treat explicitly later in Eq. (30) and on). This term represents the probability to obtain classification $s_k$ when observing an object of class c from relative pose $x_k^{(rel)}$ given previous classification results and relative poses. The second term in Eq. (27) can be approximated using Eq. (2) for the individual observations $z_i$, i.e.

$$\mathbb{P}(S_{0:k-1}|c, H_k \setminus \{z_k\}) = \mathbb{P}(S_{0:k-1}|\mathcal{Z}_{0:k-1}) \approx \prod_{i=0}^{k-1} \mathbb{P}(s_i|z_i)$$

Note that class c and poses $X_{0:k-1}^{(rel)}$, both members of $H_k$ can be omitted since conditioning on observations determines classifier outputs up to uncertainty due to classifier intrinsics (model uncertainty). The approximation is in the last equality, since in general classifier outputs $s_0, \ldots, s_{k-1}$ are interdependent through classifier parameters. We can now rewrite $\mathbb{P}(s_k|c, H_k \setminus \{z_k\})$ from Eq. (27) as $$\int_{S_{0:k-1}} \mathbb{P}(s_k|c, S_{0:k-1}, X_{0:k}^{(rel)}) \cdot \prod_{i=0}^{k-1} \mathbb{P}(s_i|z_i) dS_{0:k-1}. \tag{28}$$

Assuming classifier output Eq. (2) is Gaussian, we denote $$\mathbb{P}(s_i|z_i) = N(\mu_{z_i}, \Sigma_{z_i}) \tag{29}$$

where $\mu_{z_i}$ and $\Sigma_{z_i}$ are estimated from $S_i$. Since class model is Gaussian, see Eq. (12), the first term in the integrand in Eq. (28) is a Gaussian that we denote as $$\mathbb{P}(s_k|c, S_{0:k-1}, X_{0:k}^{(rel)}) = N(\mu_{k|0:k-1}, \Sigma_{k|0:k-1}) \tag{30}$$

where, utilizing standard Gaussian Process equations (see, for example, C. E. Rasmussen and C. K. I. Williams. Gaussian Processes for Machine Learning, The MIT press, Cambridge, Mass., 2006):

$$\mu_{k|0:k-1} = \mu_k + \Omega \cdot (S_{0:k-1} - \mu_{0:k-1}) \tag{31}$$

$$\Sigma_{k|0:k-1} = K(x_k, x_k) - \Omega \cdot K(\mathcal{X}_{0:k-1}, x_k) \tag{32}$$

with $\Omega \doteq K(x_k, X_{0:k-1}) K(X_{0:k-1}, X_{0:k-1})$.

Using these relations, the integrand from Eq. (28) is a Gaussian distribution over $S_{0:k}$, that can be inferred as follows.

$$\mathbb{P}(s_k|c, S_{0:k-1}, X_{0:k}^{(rel)}) \cdot \prod_{i=0}^{k-1} \mathbb{P}(s_i|z_i) = \tag{33}$$

$$\eta \exp\left\{-\frac{1}{2}\left(\|s_k - \mu_{k|0:k-1}\|^2_{\Sigma_{k|0:k-1}} + \sum_{i=0}^{k-1} \|s_i - \mu_{z_i}\|^2_{\Sigma_{z_i}}\right)\right\},$$

where $\eta$ only depends on $\mathcal{Z}_{0:k}^{(rel)}$. Using Eq. (31) we can write $$s_k - \mu_{k|0:k-1} = s_k - \mu_k - \Omega \cdot (S_{0:k-1} - \mu_{0:k-1}) \tag{34}$$

$$= [-\Omega I](S_{0:k} - \mu_{0:k}) \tag{35}$$

We have that the integrand Eq. (33) from Eq. (28) is proportional to a joint Gaussian distribution $N(\mu_J, \Sigma_J)$ with $$\Sigma_J = \left(\sum_s^{-1} + \sum_z^{-1}\right)^{-1} \tag{36}$$

$$\mu_J = \sum_J^{-1} \cdot \left(\sum_s^{-1} \mu_s + \sum_z^{-1} \mu_z\right), \tag{37}$$

where $$\mu_s = \begin{pmatrix} \mu_0 \\ \vdots \\ \mu_{k-1} \\ \mu_k \end{pmatrix} \mu_z = \begin{pmatrix} \mu_{z_0} \\ \vdots \\ \mu_{z_{k-1}} \\ 0 \end{pmatrix}, \tag{38}$$

and $$\sum_{s}^{-1} = [-\Omega \ I]^T \sum_{k|0:k-1}^{-1} [-\Omega \ I] \quad (39)$$

$$\Sigma_z^{-1} = \begin{pmatrix} \sum_{z_0}^{-1} & 0 & \cdots & 0 \\ 0 & \ddots & & \vdots \\ \vdots & & \sum_{z_{k-1}}^{-1} & 0 \\ 0 & \cdots & 0 & 0 \end{pmatrix} \quad (40)$$

Finally, the class likelihood from Eq. (27) is the marginal distribution of the above. Specifically, the integral is directly calculated by evaluation at $s_k$ of a Gaussian PDF with the components corresponding to $s_k$ from $\mu_J$ and $\Sigma_J$ as mean and covariance. The above steps show the calculation of term (a) of Eq. (17), for updating the class belief given known localization, upon arrival of new measurements. The next section describes the calculation of term (b) of Eq. (17), the "localization" belief term.

Localization Inference

We assume that object orientation relative to the robot is known (perhaps, detected from observations $\mathcal{Z}$), and so o has three degrees of freedom (location). Hence, term (b) of Eq. (17) is essentially a SLAM problem with the robot pose history $X_{0:k}$ and one landmark, the target object pose o, to be inferred. Specifically, we can express the target distribution as marginalization over all landmarks $\mathcal{L}$, except the object of interest $$\mathbb{P}(X_{0:k}, o | \mathcal{H}_k) = \int_L \mathbb{P}(\mathcal{X}_{0:k}, o, \mathcal{L} | \mathcal{H}_k) d\mathcal{L}. \quad (41)$$

This can be computed using state of the art methods such as iSAM2, as described by M. Kaess, et al., "iSAM2: Incremental smoothing and mapping using the Bayes tree," Intl. J. of Robotics Research, 31:217-236, February 2012.

To review, the procedure of the present invention includes the following steps. Inputs include 1) a "belief" (i.e., uncertain estimate of) robot track and the environment, $S_{0:k-1}$, which is a vector of $s^{nominal}$ from previous time steps. and 2) observations from current time step. The procedure is run at each time step.

Results

As described above, embodiments of the present invention provide methods for classification of an object that is viewed from multiple directions. The method includes fusing classifier measurements which include a model uncertainty measure, and explicitly accounting for viewpoint-variability and spatial correlations of classifier outputs, as well as uncertainty in the localization. Simulation experiments described in this section confirm increased robustness to the above sources of uncertainty as compared to current methods. In particular, statistical analysis suggests that in cases where other methods inferred a wrong class with high confidence due to noisy measurements of class or location, the method of the present invention reported high uncertainty, and was generally able to accumulate classification evidence.

In the experimental simulation described below, performed in MATLAB, classifier measurements were generated using the GP model of the ground truth class, along a predetermined track, as shown in FIG. 2.

The class inference algorithm needs to fuse these measurements into a posterior over classes, essentially identifying which of the known GP models is the most likely origin of the measurements. We study robustness of the GP model to model and localization uncertainty, and compare the results with results obtained from other methods.

Comparison of Approaches and Performance Metrics

We compare the results of three methods. The method of the present invention is denoted as Model with Uncertainty, which takes into account spatial correlations, as well as uncertainty in pose and classifier model uncertainty. The second method is Model Based, similar to the method described by Teacy but with GP defined as in Eq. (11), which takes into account spatial correlation, but not uncertainties. The third method is Simple Bayes, which directly uses the classifier scores and assumes spatial independence between observations, as in, for example, T. Patten, et al., "Viewpoint evaluation for online 3-d active object classification," IEEE Robotics and Automation Letters (RA-L), 1(1):73-81, January 2016.

We compare these methods with relation to the following metrics: (i) probability of ground-truth class; (ii) mean squared detection error; and (iii) most likely-to-ground truth ratio.

---

Input: Localization posterior $\mathbb{P}(\mathcal{X}_{0:k}, o | \mathcal{H}_k)$, new observations $\mathcal{Z}_k$ 1:    $S_k = \{s_k^{(i)}\}_{i=1}^{n_k} \leftarrow$ CLASSIFYWITHDROPOUT($\mathcal{Z}_k$), pre-calculate $\Sigma_z^{-1}$, $\mu_z$    ▷ Uncertain classifier measurements are obtained from the raw observations.

2:    Sample $\{\mathcal{X}_{0:k}^{(i)}, o^{(i)}\}_{i=1}^{n_x} \sim \mathbb{P}(\mathcal{X}_{0:k}, o | \mathcal{H}_k)$    ▷ Samples are taken from the trajectory and environment estimates.

3:    for $\mathcal{X}_{0:k}, o \in \{\mathcal{X}_{0:k}, o\}$ do    ▷ Classification is computed, given the trajectory and environment sample/realization at step 12.

4:      $\forall c \in \mathcal{C}$ calculate $\Sigma_J$, $\mu_J$    ▷ These are per-class through GP model 5:      for $s_k \in S_k$ do 6:        for $c \in \mathcal{C}$ do 7:          $\mathbb{P}(s_k | c, H_k \setminus \{\mathcal{Z}_k\}) \leftarrow N(s_k; \mu_J^{(k)}, \Sigma_J^{(k,k)})$    ▷ Likelihood given past observations,    Eq. (27)

8:          $\tilde{h}^c \leftarrow \mathbb{P}(s_k | c, H_k \setminus \{\mathcal{Z}_k\}) \cdot \mathbb{P}(c | H_{k-1})$    ▷ Unnormalized class likelihood,    Eq. (23)

9:        end for

10:        $\mathbb{P}(c | s_k, H_k) \leftarrow \tilde{h}^c/\eta(s_k)$,    $\eta(s_k) = \Sigma_c \tilde{h}^c$    ▷ Normalize class likelihood,    Eqs. (22, 23). Eq. (23)

11:      end for

12:      $\mathbb{P}(c | H_k)^{(i)} \leftarrow \Sigma_{s_k} \mathbb{P}(c | s_k, H_k)/n_k$    ▷ Marginalization is performed over the trajectory/environment samples.    ▷ Classification given localization,    Eq. (18)

13:    end for

14:    $\mathbb{P}(c | \mathcal{H}_k) \leftarrow \Sigma_i \mathbb{P}(c | H_k)^{(i)}/n_x$ The mean squared detection error (MSDE) is defined as $$MSDE \doteq \frac{1}{N_c} \sum_{c' \in C} (\delta_c(c') - \mathbb{P}(c'|\mathcal{H}))^2 \qquad (42)$$

where c is the ground truth class and $\delta_c(c')$ is 1 if c=c' and 0 otherwise. This measure was also used in Teacy.

The most likely-to-ground truth ratio (MGR) is defined as $$MGR \doteq \frac{\arg\max_{c'} \mathbb{P}(c'|\mathcal{H})}{\mathbb{P}(c|\mathcal{H})} \qquad (43)$$

for ground truth class c. Roughly, this measure penalizes high confidence in the wrong class. In a way it "demands" ground truth class to be most (possibly, equally) likely.

Simulation Experiments

Figure 1:
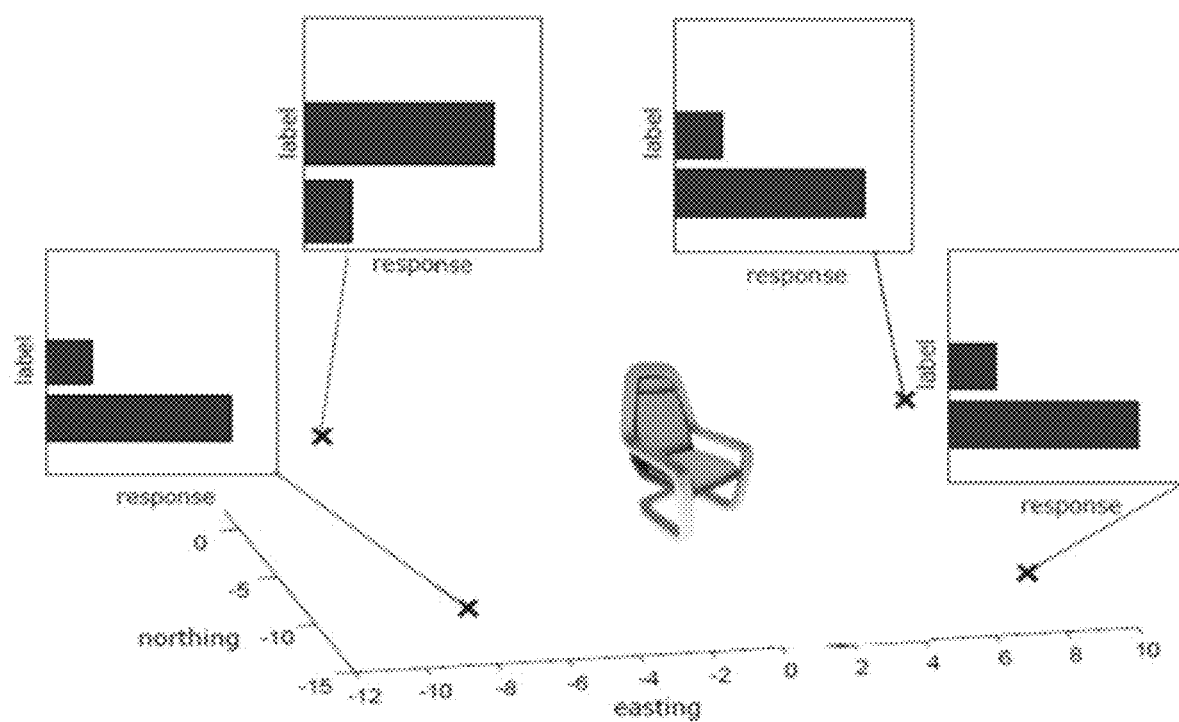
FIG. 1 is a schematic diagram of a scenario indicating labeling of an object class from measurements of an object viewed from multiple poses, according to an embodiment of the present invention.

Statistics (over realizations) for the three algorithms were collected for several scenarios. In each scenario, GP models were created for three classes, by manually specifying classifier response for chosen relative locations around the origin (i.e. locations assumed to be in object-centered coordinates) in the 2D plane, as indicated in FIG. 1. Note that a GP model for a class describes classifier responses for all classes, (see Eq. (15)).

During each simulation, the robot moved along a pre-specified trajectory and observed a single object from different viewpoints, as indicated in FIG. 2. At each time step the algorithm received new classifier measurements and updated pose belief (simulating a SLAM solution). Classifier measurements were generated using the GP model of a "ground truth" class (the simulation of measurements is detailed in the next subsections), which needs to be inferred by the algorithm using the measurements.

Model Uncertainty Scenario

Model uncertainty expresses the reliability of the classifier output. High model uncertainty corresponds to situations where classifier inputs are far from training data, often due to an unfamiliar scene, object or viewpoint pictured, causes output that may be arbitrary. We simulated this with two steps, performed at each time instant: first, a nominal "true" measurement $s^{nominal}$ is generated from the GP model of the ground truth class.

The level of model uncertainty $\sigma_u^2$ was selected at each time step uniformly between 0 and $\sigma_{max}^2$ (a parameter). This level was then used as a standard deviation of a Gaussian centered at the true measurement, to generate a simulated noised measurement $s^{noised}$. The Model Based and Simple Bayes algorithms receive $s^{noised}$ as a classification measurement and are not "aware" of the uncertainty. The procedure for simulating classifier outputs for the simulation at each step is described algorithmically here:

```
Input: S_{0:k-1}, X_{0:k}^{(rel)}, σ_max^2, N_samples
1: s^nominal ~ ℙ(s | c, S_{0:k-1}, X_{0:k}^{(rel)})     ▷ See Eq. (30)
2: σ_u^2 ~ Uni(0, σ_max^2)                              ▷ Choose uncertainty level
3: s^noised ~ N(s^nominal, σ_u^2 I)                     ▷ Uncertain classification
4: samples ← ∅
5: for N_samples times do                               ▷ Simulating dropout
6:     s ~ N(s^noised, σ_u^2 I)
7:     samples ← samples ∪ {s}
8: end for
9: return s^nominal, s^noised, samples
```

As indicated, the procedure included receiving samples (simulating outputs of several forward passes applying dropouts) drawn from a Gaussian distribution centered at $s^{noised}$ with standard deviation $\sigma_u^2$. The first simulation showed the effects of considerable model uncertainty, with no localization errors (perfect localization).

Figure 3A:
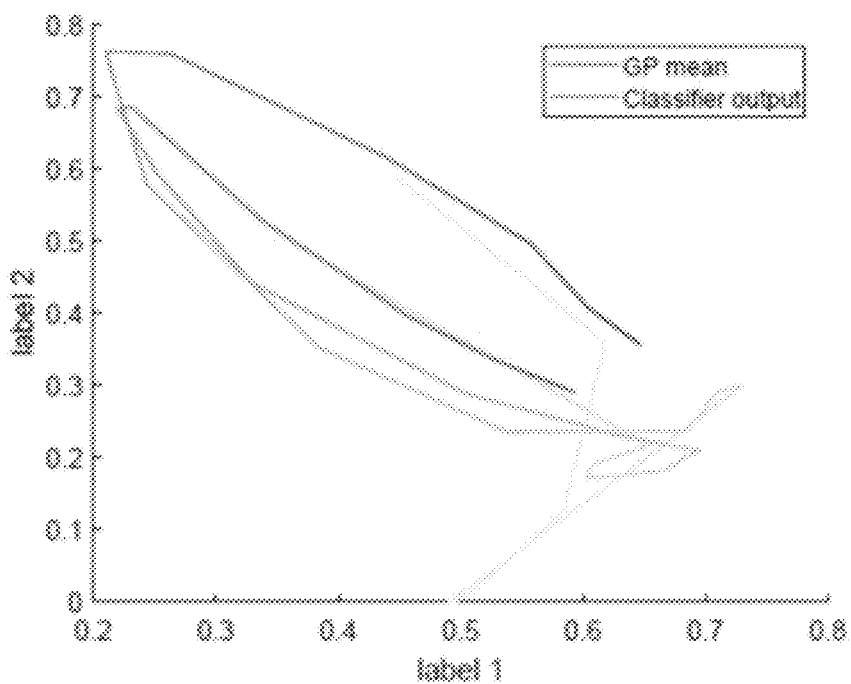
FIGS. 3A-C are graphs of model certainty while measurements are made during the course of a robot movement along a path in the vicinity of an object of interest, according to an embodiment of the present invention.
Figure 3B:
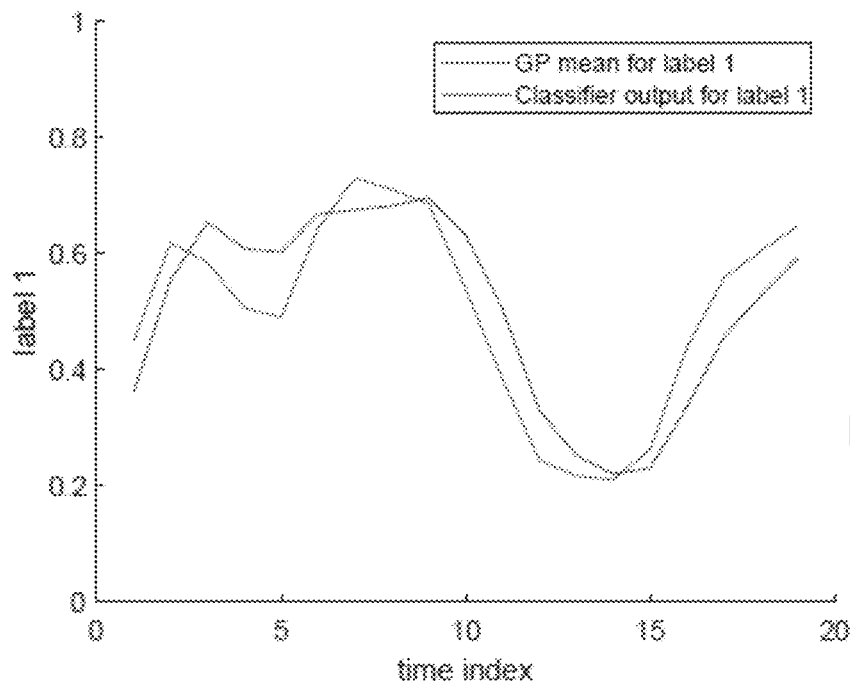
Figure 3C:
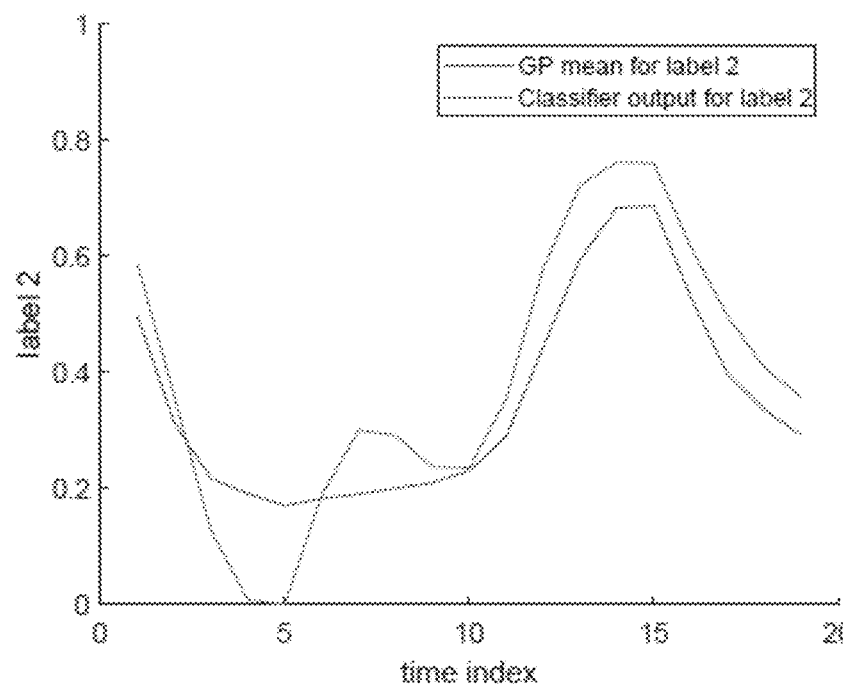

FIGS. 3A-C show plots of a GP model of ground truth class and simulated classifier measurements ($s^{noised}$) while measurements are being made, while a robot moves along a path. FIG. 3A shows the Gaussian process model for ground truth class and simulated (noised) classifier measurement over the course of a robot's trajectory, showing plots of response for a 1st label against response for a second label. FIGS. 3B and 3C show first and second components over time indices, respectively.

Figure 4A:
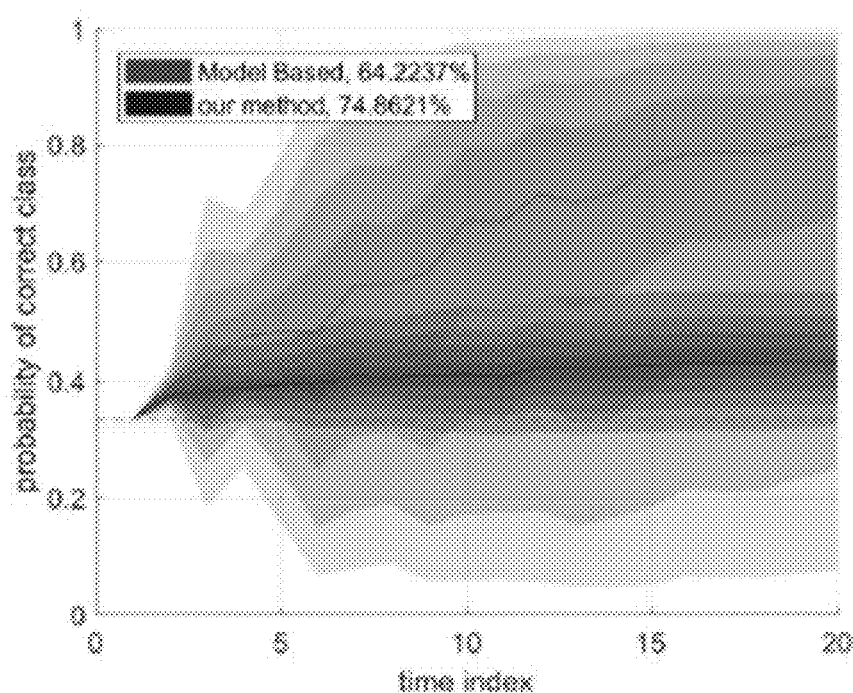
FIGS. 4A-F are graphs of simulation results comparing the methods of the present invention with other methods, indicating result metrics of probability of correct class, mean likely-to-ground truth ratio (MGR), and mean squared detection error (MSDE), according to an embodiment of the present invention.
Figure 4B:
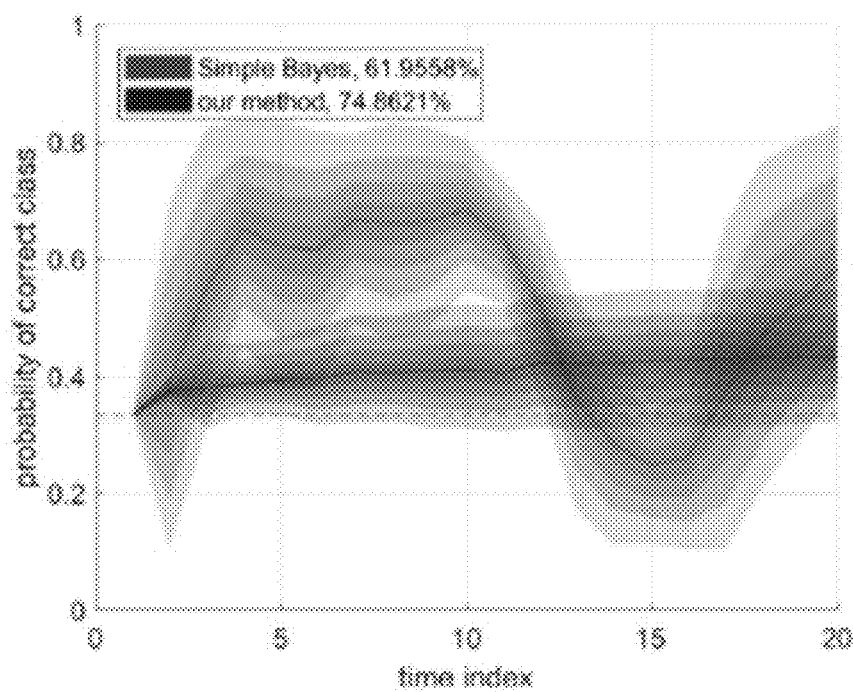
Figure 4C:
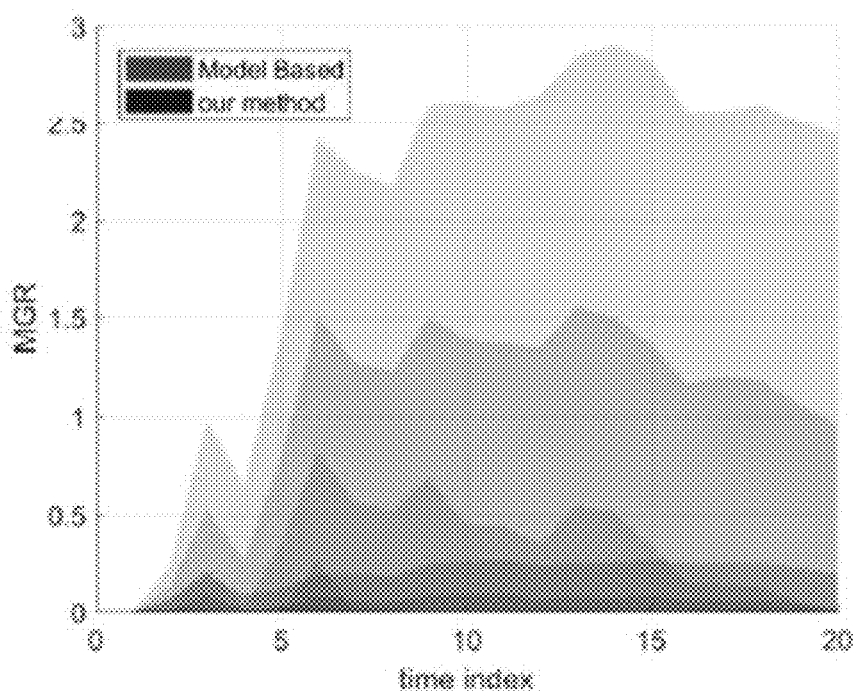
Figure 4D:
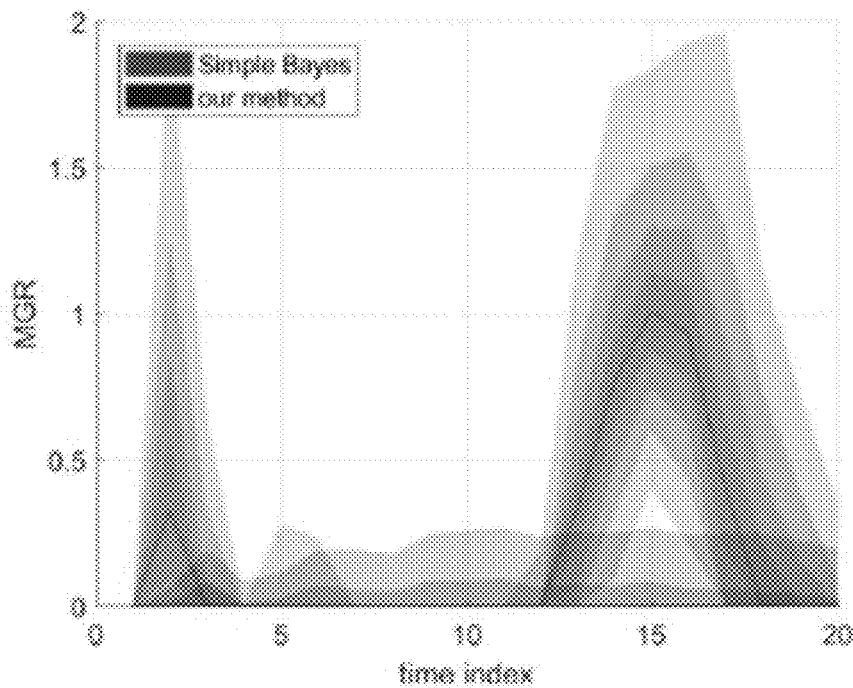
Figure 4E:
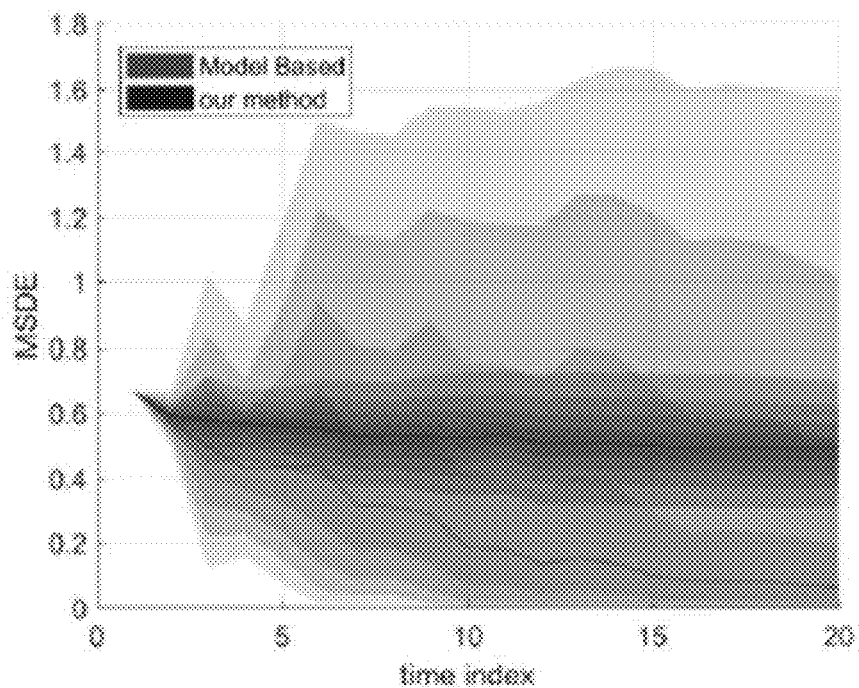
Figure 4F:
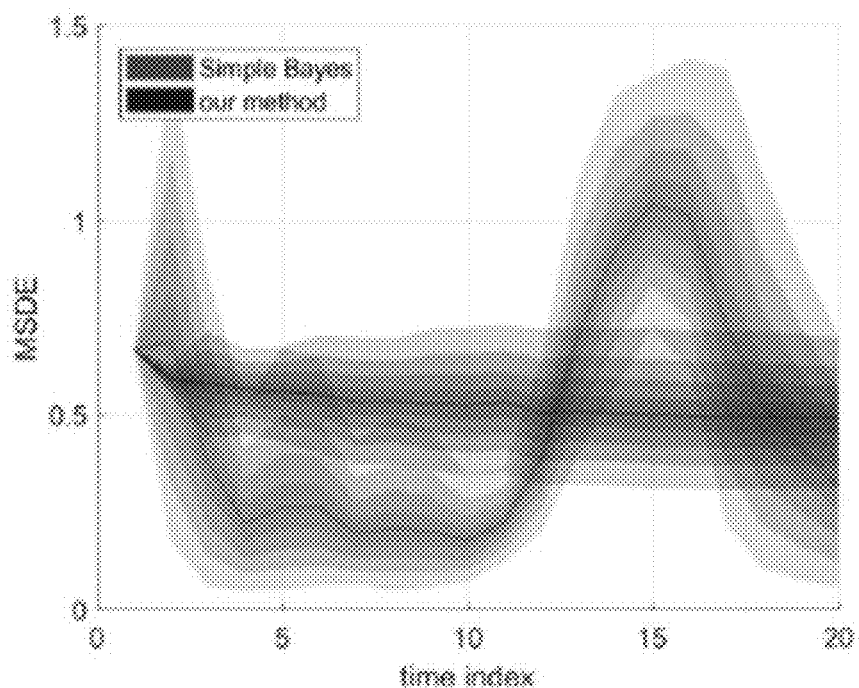

FIGS. 4A-F show the statistics described above, with a probability assigned to a ground truth class and Eqs. (42-43) along with percentiles (over scenario realizations) as patches of varying saturation, with a 10% step: the median is plotted darkest, the next lighter patch indicates runs between 40th and 60th percentile, the next indicates runs between 30th and 70th, etc. The areas above and below the plots contain the top and bottom 10% of the runs respectively. FIGS. 4A, 4C, and 4E show comparisons of the method of the Model Based (green) to the method of the present invention ("our method"), for the respective metrics of probability of correct class, the mean likely-to-ground truth ratio (MGR), and the mean squared detection error (MSDE). FIGS. 4B, 4D, and 4F show comparisons of the method of Simple Bayes (red) to the method of the present invention ("our method") comparisons of the method of the Model Based (green) to the method of the present invention ("our method"), also for the respective metrics of probability of correct class, MGR, and MSDE. The legend in the leftmost column shows the percentage of time steps where the most likely class was the correct one.

In comparison with the method Model Based, results for the present method were more concentrated (FIGS. 4A, 4C, 4E), which means that the method results were more stable. For example, in more than 20% of the runs (bottom lightest shade and the white area below that), the probability of a correct class for Model Based in time step 15 was less than 0.2 (compared to more than 0.33 for ours). In more than 20% of the runs the MGR for Model Based at iteration 15 was higher than 1, which means that a wrong (most likely) class was assigned probability more than twice higher than the correct one, i.e. the wrong class was chosen with a high confidence. The MSDE plot displays similar behavior. In FIGS. 4B, 4D, and F, a drop in the accuracy of the Simple Bayes around time step 15 was the result of an "inverse" measurement in the model, meaning that from a certain angle, the classifier response suggested a different class. This illustrates the difference between our method and the other methods, which match the entire sequence of measurements against a model, and thus can use also "inverse" measurements to classify correctly (on the downside, requiring a class model).

Localization Uncertainty Scenario

Figure 5A:
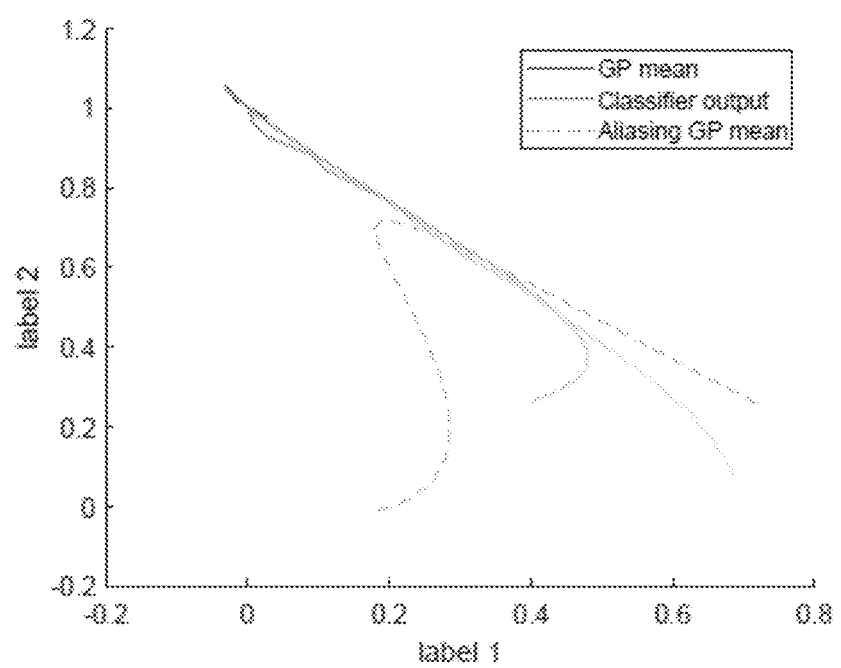
FIGS. 5A-C are graphs of ground truth class and simulated (noised) classifier measurements from multiple sequential poses, with localization bias, according to an embodiment of the present invention.

In methods making use of spatial class models, localization errors may cause classification aliasing when acquired measurements correspond to the model of a wrong class, because of the spatial shift in the query. To exemplify this, in a "Localization Uncertainty" scenario, we introduced a constant bias in an easting coordinate (where the robot moves eastward in a straight line), causing aliasing between models (with no model uncertainty). FIG. 5A shows a GP mean of the correct class model (blue) and classifier output over a robot track (red). It also shows the GP mean of the model of a wrong class (yellow).

Figure 5B:
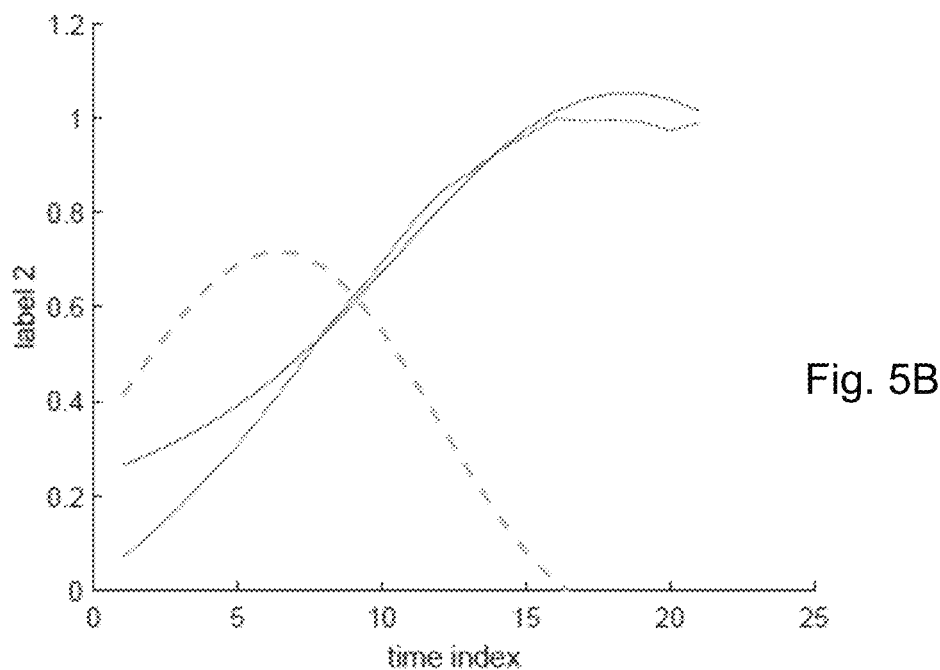
Figure 5C:
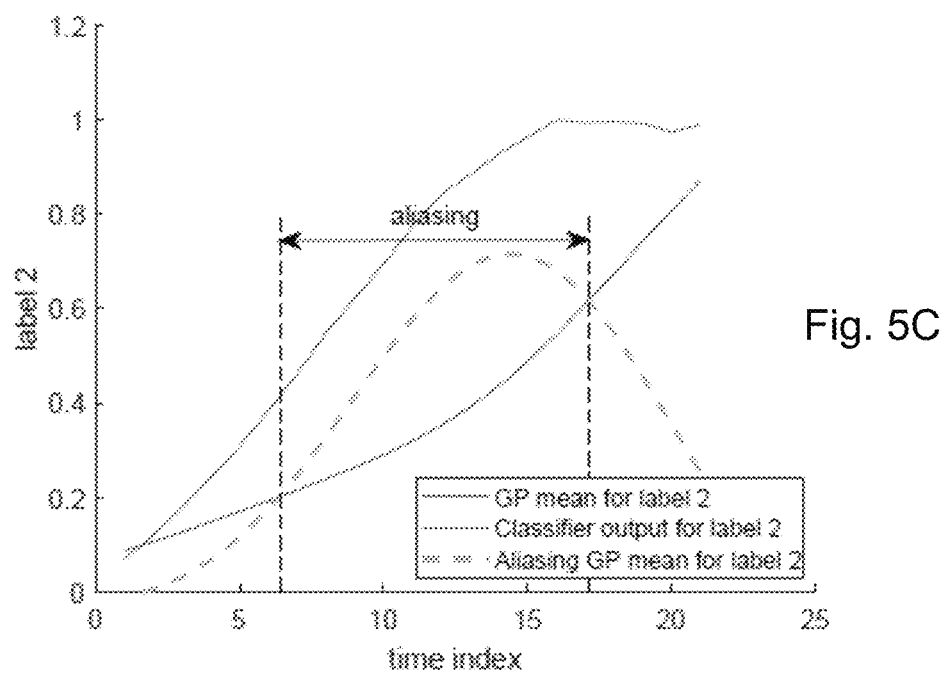

In FIG. 5B, classifier outputs for label 2 (red) are compared without localization bias against the corresponding GP component of the ground truth class model (blue), showing a clear match. FIG. 5C shows that after introducing a bias of −8 units in easting, classifier responses (red) were matched against shifted spatial models, making the wrong class (yellow) a more likely match until approximately time step 16, after which the blue line matched correctly in spite of the shift.

Figure 6A:
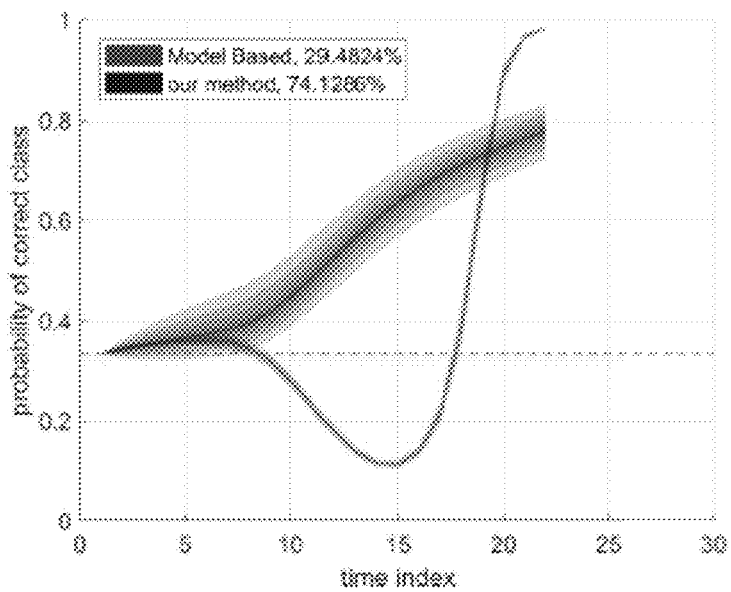
FIGS. 6A-F are graphs of simulation results with localization bias, comparing results of the present invention with other methods, indicating result metrics of probability of correct class, MGR and MSDE, according to an embodiment of the present invention.
Figure 6B:
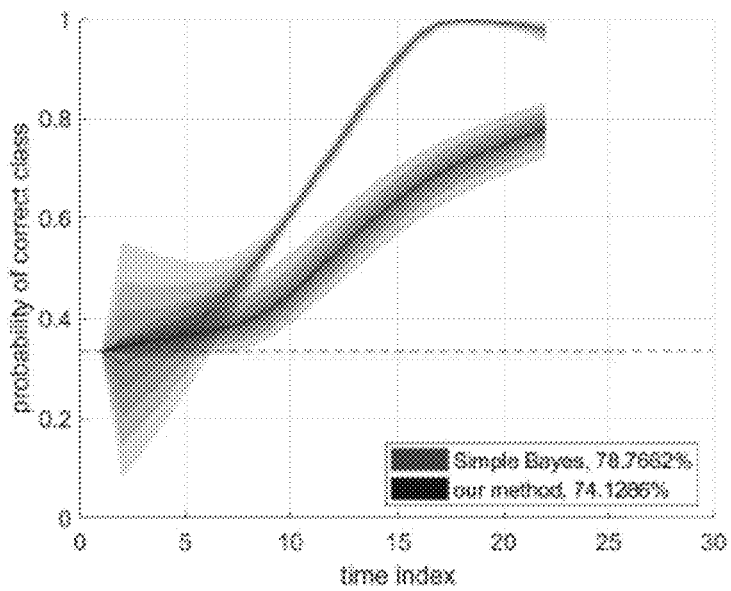
Figure 6C:
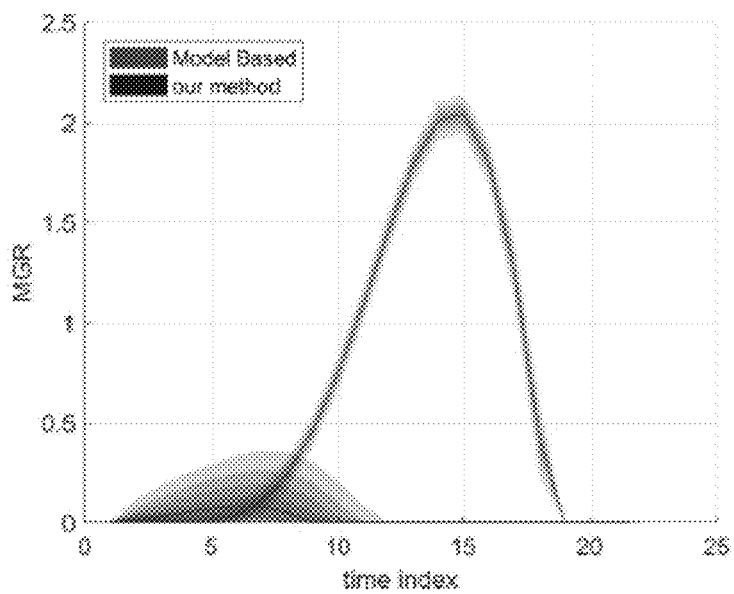
Figure 6D:
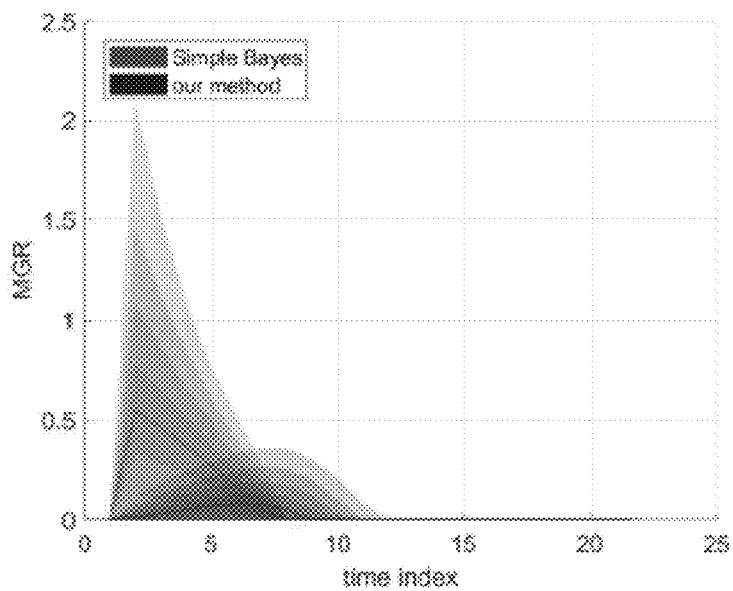
Figure 6E:
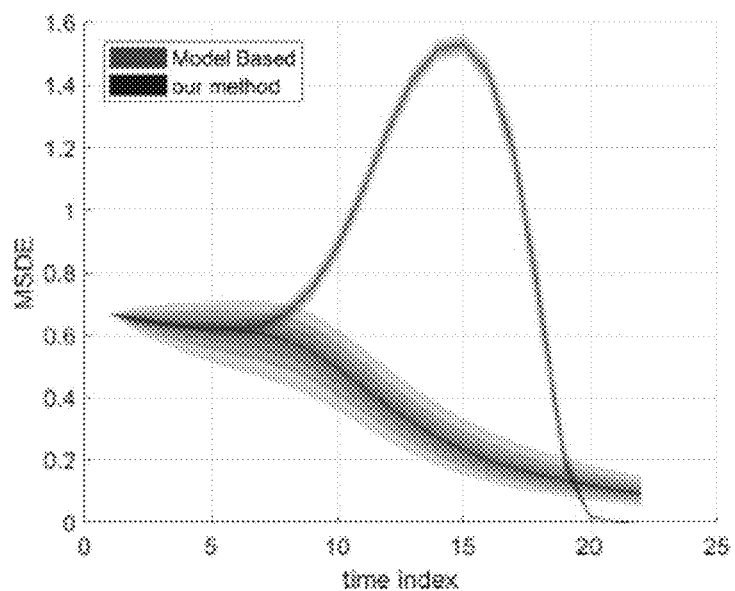
Figure 6F:
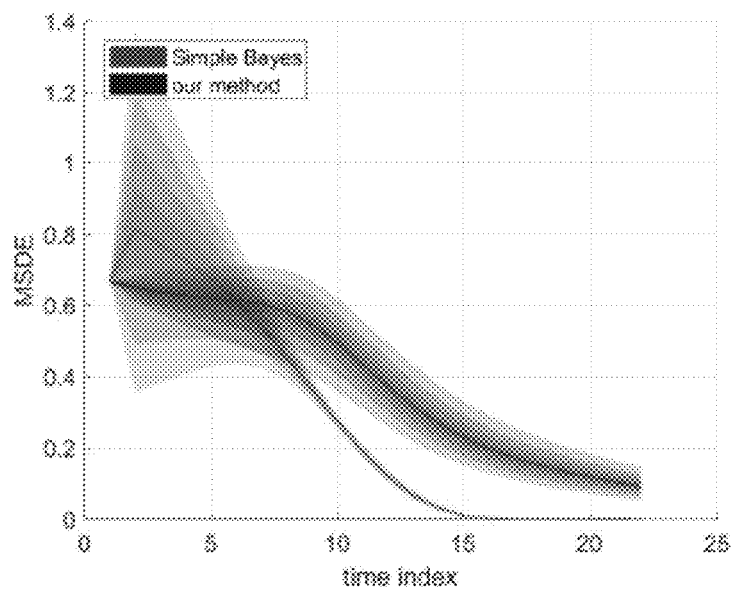

The effects of this on performance are shown in FIGS. 6A-F. Our method accumulates classification evidence rather than prematurely emitting an (over)confident possibly wrong classification decision. By contrast, the Model Based method infers the wrong class with high confidence (as can be seen in the MGR plots, FIGS. 6C and 6D) peaking approximately at time step 15, after which disambiguating measurements start to arrive. As can be seen in FIG. 6D, Simple Bayes method performs well, closely following the line from the respective FIG. 5 graph, because the classifier measurements are stable and not ambiguous. Note that aliasing occurs when trying to match against the different models.

The classification observations were generated as follows: a GP model of the ground truth class along with previous classification measurements were used to generate a "ground truth" measurement. A "noised" measurement was generated from a Gaussian centered there at (fed to Model Based and Simple Bayesian schemes), and a cloud of measurements was generated around the noised measurement to reflect the distance from the ground truth (fed to our scheme). The standard deviation for generation of the noised classification measurement was uniformly picked at each time step from a range defined per experiment.

Processing elements of the system described herein may be implemented in digital electronic circuitry, or in computer hardware, firmware, software, or in combinations thereof. Such elements can be implemented as a computer program product, tangibly embodied in an information carrier, such as a non-transient, machine-readable storage device, for execution by, or to control the operation of, data processing apparatus, such as a programmable processor, computer, or deployed to be executed on multiple computers at one site or one or more across multiple sites. Memory storage for software and data may include multiple one or more memory units, including one or more types of storage media. Examples of storage media include, but are not limited to, magnetic media, optical media, and integrated circuits such as read-only memory devices (ROM) and random access memory (RAM). Network interface modules may control the sending and receiving of data packets over networks. Method steps associated with the system and process can be rearranged and/or one or more such steps can be omitted to achieve the same, or similar, results to those described herein. It is to be understood that the embodiments described hereinabove are cited by way of example, and that the present invention is not limited to what has been particularly shown and described hereinabove.

What is claimed:

1. A method of classifying objects for robotic situational awareness, based on robotic observations obtained from multiple sequential viewpoints, the method implemented by at least one processor according to instructions stored in non-transient memory storage, the method comprising:

from a training set of sequential observations and corresponding viewpoints, generating, for each class of a set of classes of objects, a viewpoint-dependent class model representing each class as a Gaussian process, wherein each class model includes spatial correlations between the viewpoints in classifier measurements for the corresponding observations;

subsequently:

A. acquiring a history $H_k$ of multiple sequential robotic observations and controls up to a time k, including an observation at time k, denoted as $z_k$;

B. applying a classifier to generate from $z_k$ a set $S_k$ of classifier measurements, wherein the distribution of $S_k$ represents a model uncertainty of the classifier, wherein each classifier measurement $s_k$ of the set $S_k$ is a vector, each component of which indicates a likelihood of an object belonging to a class represented by the component;

C. sampling a trajectory $X_{0:k}$ and a pose o of an object from a joint pose distribution of trajectories and object poses, given the history $H_k$;

D. sampling a classifier measurement $s_k$ from the set $S_k$;

E. for each component $s^{(i)}$ of the sampled classifier measurement $s_k$, applying the class model for a class c represented by the component to calculate a likelihood of $s^{(i)}$ belonging to the class c, given observations prior to time k;

F. from the likelihood of each $s^{(i)}$, generating a likelihood value $P(s_k|c,H_k\backslash\{z_k\})$, representing a likelihood value of $s_k$ belonging to a given class c, wherein the likelihood value of $s_k$ is calculated by a function employing the spatial correlations of the class model of the given class c and a model uncertainty in past classifier measurements;

G. generating, from the likelihood value of $s_k$, a normalized class likelihood value $P(c|s_k,H_k)$;

H. generating an average class likelihood, $P(c|H_{k(i)})$, for the given class c, given $H_k$ with respect to the sampled trajectory, by repeating the calculation of the normalized class likelihood value for multiple samples $s_k$, given the sampled trajectory;

I. generating, for multiple sampled trajectories of $X_{0:k}$, multiple respective average class likelihoods;

J. averaging the average class likelihoods to generate a total average class likelihood $P(c|H_k)$ for the given class c, given $H_k$, indicative of a probability of the object belonging to the given class c, given trajectory uncertainty, viewpoint-dependent variations, and model uncertainty of the classifier; and, K. repeating steps G-J for each class of the set of classes of objects to determine the highest total average class likelihood $P(c|H_k)$, and responsively generating the class and the total average class likelihood of the most likely class of the object.

2. The method of claim 1, wherein the normalized likelihood $P(c|s_k,H_k)$ is calculated from the likelihood value of $s_k$ by calculating, at an interim step, a weighted value $\tilde{h}^c \doteq P(s_k|c,H_k\backslash\{z_k\}) \cdot P(c|H_{k-1})^{(i)}$, wherein $P(c|H_{k-1})^{(i)}$ is saved from a previous time step k−1.

3. The method of claim 2, wherein $P(c|s_k,H_k)$ is calculated as $\tilde{h}^c/\Sigma_c \tilde{h}^c$, where the denominator $\Sigma_c \tilde{h}^c$ is a sum taken over a set of multiple candidate classes c.

4. The method of claim 1, wherein the likelihood value of $s_k$ is calculated as a marginalization of a Gaussian distribution $P(s_{0:k}|c,H_k\dagger\{z_k\})$, wherein $s_{0:k} \doteq (s_0, s_1, \ldots, s_k)$ is a set of classifier measurements taken at sequential times 0 through k.

5. The method of claim 4, wherein the Gaussian distribution has a mean $\mu_j$ and a covariance matrix $\Sigma_j$ defined as:

$$\Sigma_J = \left(\Sigma_s^{-1} + \Sigma_z^{-1}\right)^{-1}, \mu_J = \Sigma_J^{-1} \cdot \left(\Sigma_s^{-1}\mu_s + \Sigma_z^{-1}\mu_z\right)$$

where the terms $\Sigma_s$, representing a covariance matrix, and $\mu_s$, representing a mean vector, are obtained through applying the class model to the trajectory sample $X_{0:k}$ and to the object pose sample o, and where the terms $\Sigma_z$, representing a covariance matrix, and $\mu_z$, representing a mean vector, are constructed from sets of classifier measurement samples, such that $\mu_s$ and $\mu_z$ respectively represent the vectors:

$$\mu_s = \begin{pmatrix} \mu_0 \\ \vdots \\ \mu_{k-1} \\ \mu_k \end{pmatrix} \mu_z = \begin{pmatrix} \mu_{z_0} \\ \vdots \\ \mu_{z_{k-1}} \\ 0 \end{pmatrix}$$

and wherein $\Sigma_s^{-1}$ and $\Sigma_z^{-1}$ respectively represent the matrices:

$$\Sigma_s^{-1} = \begin{bmatrix} -\Omega & I \end{bmatrix}^T \Sigma_{k|0:k-1}^{-1} \begin{bmatrix} -\Omega & I \end{bmatrix}$$

and $$\Sigma_z^{-1} \begin{pmatrix} \Sigma_{z_0}^{-1} & 0 & \cdots & 0 \\ 0 & \ddots & & \vdots \\ \vdots & & \Sigma_{z_{k-1}}^{-1} & 0 \\ 0 & \cdots & 0 & 0 \end{pmatrix}$$

6. The method of claim 5, wherein the steps A-K are performed iteratively at multiple sequential time steps, and wherein vector $\mu_z$ and matrix $\Sigma_z^{-1}$ are calculated prior to the steps A-J at each time step.

7. The method of claim 1, wherein the set of classifier measurements $S_k$ is obtained by applying Monte-Carlo dropout to the classifier with the observation $z_k$ as input, for each classifier measurement $s_k$.

8. The method of claim 6, wherein the set of classifier measurements $S_k$ is obtained by applying Monte-Carlo dropout in a single forward pass.

9. The method of claim 1, wherein the steps A-K are iterative steps performed at sequential time steps, and wherein the Gaussian processes that represent the classes are fit to their respective classes one time prior to the iterative steps.

* * * * *